(12) United States Patent
Ueyama et al.

(10) Patent No.: US 9,097,381 B2
(45) Date of Patent: Aug. 4, 2015

(54) IMAGE FORMING APPARATUS

(71) Applicant: Seiko Epson Corporation, Tokyo (JP)

(72) Inventors: Naohiro Ueyama, Matsumoto (JP); Hiroaki Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 13/780,680

(22) Filed: Feb. 28, 2013

(65) Prior Publication Data

US 2013/0264457 A1    Oct. 10, 2013

(30) Foreign Application Priority Data

Apr. 6, 2012  (JP) ................................. 2012-087638

(51) Int. Cl.
| | |
|---|---|
| *F16M 11/02* | (2006.01) |
| *F16M 13/02* | (2006.01) |
| *B41J 29/02* | (2006.01) |
| *B41J 29/04* | (2006.01) |
| *B41J 29/13* | (2006.01) |

(52) U.S. Cl.
CPC ................. *F16M 13/02* (2013.01); *B41J 29/02* (2013.01); *B41J 29/04* (2013.01); *B41J 29/13* (2013.01)

(58) Field of Classification Search
CPC .............. G03G 2221/1651; G03G 2221/1696; G03G 21/1647; G03G 2221/1654; G03G 2221/1678; B41J 15/04; B41J 29/06; B41J 2/16508; F16M 11/00
USPC ................... 248/544, 672, 673, 177.1, 188.3, 248/346.03, 346.5; 108/50.01; D18/59
See application file for complete search history.

(56) References Cited

U.S. PATENT DOCUMENTS

| | | | |
|---|---|---|---|
| 4,512,543 A * | 4/1985 | Petrick | 248/670 |
| 4,928,918 A * | 5/1990 | Bowes | 248/688 |
| 5,080,320 A * | 1/1992 | Chieng | 248/670 |
| 5,240,334 A * | 8/1993 | Epstein et al. | 400/88 |
| 5,954,307 A * | 9/1999 | Williams | 248/501 |
| 6,029,940 A * | 2/2000 | Klein | 248/346.04 |
| 7,110,713 B2 * | 9/2006 | Cheng | 399/367 |
| 7,130,548 B2 * | 10/2006 | Uchida | 399/12 |
| 7,427,122 B2 * | 9/2008 | Nakashima | 347/33 |
| 7,806,376 B2 * | 10/2010 | Song et al. | 248/177.1 |

(Continued)

FOREIGN PATENT DOCUMENTS

| | | |
|---|---|---|
| JP | 10-226431 A | 8/1998 |
| JP | 2002-258562 A | 9/2002 |
| JP | 2002-332127 A | 11/2002 |

*Primary Examiner* — Bradley Duckworth
(74) *Attorney, Agent, or Firm* — Nutter McClennen & Fish LLP; John J. Penny, Jr.; Joshua I. Rudawitz (57) ABSTRACT

A leg unit includes a positioning pin projecting from an upper surface of a seat plate thereof, and an image forming unit includes a positioning hole formed on a mounting surface thereof. Delimiting portions project downward from the lower ends of left and right lateral faces of the image forming unit. The delimiting portions oppose respective outer lateral faces of the seat plate so as to restrict a relative movement of the image forming unit. A projecting portion is provided on the outer lateral face of the seat plate. The positioning pin can be fitted in the positioning hole by engaging the projecting portion with a recess of the delimiting portion. The delimiting portion includes a stopper formed on the respective sides of the recess in the longitudinal direction thereof, for restricting the sliding motion of the projecting portion along the lower end face of the delimiting portion.

6 Claims, 9 Drawing Sheets

(56) References Cited

U.S. PATENT DOCUMENTS

| | | | |
|---|---|---|---|
| 8,075,213 B2 * | 12/2011 | Takada et al. | 400/636 |
| 8,241,538 B2 * | 8/2012 | Lee | 264/40.5 |
| 8,342,621 B2 * | 1/2013 | Saiga et al. | 347/8 |
| 2011/0042545 A1 * | 2/2011 | Fichter et al. | 248/544 |
| 2014/0147166 A1 * | 5/2014 | Nakamura et al. | 399/110 |

* cited by examiner

IMAGE FORMING APPARATUS

BACKGROUND

1. Technical Field

The present invention relates to an image forming apparatus including an image forming unit and a pedestal unit, in which the image forming unit is placed in position on the pedestal unit.

2. Related Art

Image forming apparatuses such as a printer, a copier, and a multifunction printer can be found, for example, in JP-A-2002-258562 (see paragraphs [0005] to and FIGS. 1, 3, 4, and FIG. 6), JP-A-2002-332127 (see paragraphs [0007] to [0009] and FIG. 1), and JP-A-10-226431 (see paragraph [0005] and FIG. 1). The image forming apparatuses disclosed in these documents include an image forming unit having an image forming function, for example a printing function, placed on a pedestal unit serving as a support base. The image forming apparatuses include a positioning mechanism for setting the image forming unit in position on the pedestal unit.

For example, the image forming apparatus according to JP-A-2002-258562 includes a positioning mechanism including a positioning pin (positioning projection) located on an upper face of an option such as a paper bank (pedestal unit) additionally provided under the image forming apparatus main body, and a positioning hole (positioning recess) provided on a bottom face of the image forming apparatus main body. Upon engaging the positioning pin with the positioning hole, the position of the image forming apparatus main body with respect to the option is determined in left-right and front-back directions.

According to JP-A-2002-332127, the image forming apparatus main body includes a circular hole and an elliptical hole to be engaged with a longer and a shorter pin projecting from an upper face of an additional unit (for example a paper feed unit) provided under the image forming apparatus main body.

Further, according to JP-A-10-226431 the upper unit includes a caster and a vertically retractable positioning pin provided on a bottom plate of the upper unit, and the lower unit includes a positioning hole provided on a top plate of the lower unit. Upon fitting the positioning pin in the positioning hole, the upper unit is properly positioned with respect to the lower unit. The positioning pin is biased in the projecting direction by a spring, and when the positioning is achieved the caster is fitted in a recessed portion formed on the top plate of the lower unit, thus to settle in the recessed portion.

Now, in case that, when the image forming unit is to be mounted on the pedestal unit, the positioning projection of the pedestal unit is not properly fitted in the positioning recess of the image forming unit and the image forming unit is tilted with the mounting surface thereof disposed in contact with the positioning projection, so that the center of gravity is shifted to the tilted side, the tilted image forming unit may be relatively displaced (slip) with respect to the pedestal unit. If the image forming unit is largely shifted with respect to the pedestal unit in such a case, it requires a great effort to bring the shifted image forming unit back to the correct position where the image forming unit is supposed to be.

SUMMARY

Accordingly, an advantage of some aspects of the present invention is provision of an image forming apparatus capable of minimizing the positional shift between the image forming unit and the pedestal unit, even when the image forming unit is relatively shifted in contact with the seat plate of the pedestal unit in the attempt to engage the positioning projection with the positioning recess.

In an aspect, the present invention provides an image forming apparatus including an image forming unit mounted via a mounting surface thereof on a seat plate of a pedestal unit, one of the seat plate and the mounting surface having a positioning recess to be fitted to a positioning projection provided on the other for positioning the image forming unit with respect to the pedestal unit, and a delimiting mechanism that restricts a relative movement between the image forming unit and the seat plate, made in contact with each other. Here, the term "fitted" implies the cases where the positioning recess is closely fitted without a gap and loosely fitted with a gap, to the positioning projection. It suffices that the positioning recess allows the positioning projection to be inserted therein so as to place the image forming unit in position. In addition, it suffices that the positioning recess has a space to accommodate therein the positioning projection, and the recess may be formed, for example, as a through hole.

With the thus-configured image forming apparatus, even when the image forming unit is relatively shifted in contact with the seat plate of the pedestal unit in the positioning process including mounting the bottom face of the image forming unit on the seat plate and fitting the positioning projection in the positioning recess, the delimiting mechanism restricts the relative shift of the image forming unit halfway. Accordingly, the positional shift between the image forming unit and the pedestal unit can be minimized, even when the image forming unit is relatively shifted in contact with the seat plate of the pedestal unit in the attempt to engage the positioning projection with the positioning recess.

In the foregoing image forming apparatus, the delimiting mechanism may include a plurality of projecting portions formed on the pedestal unit so as to outwardly stick out from the seat plate in a first direction, and a stopper formed at a position that allows the stopper to contact each of the projecting portions of the image forming unit when the image forming unit and the pedestal unit relatively move in a direction intersecting the first direction.

With such a configuration, when the image forming unit and the pedestal unit relatively move in a direction intersecting the first direction, the plurality of projecting portions formed on the pedestal unit are made to abut (make contact with) the stopper formed on the image forming unit, so as to restrict halfway the relative shift between the pedestal unit and the image forming unit. Thus, the delimiting mechanism can be obtained by simply forming the plurality of projecting portions and the stopper to be engaged with each of the projecting portions.

In the foregoing image forming apparatus, it is preferable that the stopper is formed in a recessed shape, and includes a delimiting surface that restricts the movement of the projecting portion and a sloped surface formed opposite the delimiting surface in the direction intersecting the first direction, the sloped surface having a shape that makes a depth of the stopper in the receding direction shallower toward an outer edge of the stopper.

Such a configuration allows the projecting portion to move along the sloped surface which becomes shallower toward the outside of the stopper thus facilitating the projecting portion to escape from the recessed stopper, when the image forming unit is moved with respect to the pedestal unit back to the positioning location where the positioning projection confronts the positioning recess, after the projecting portion is blocked by the delimiting surface of the stopper. Therefore, the image forming unit can be brought back to the positioning location with a relatively small force.

In the foregoing image forming apparatus, it is preferable that at least one of the image forming unit and the pedestal unit includes a delimiting portion that restricts a relative movement between the image forming unit and the pedestal unit in a direction intersecting the direction in which the delimiting mechanism restricts the relative movement.

With such a configuration, the delimiting portion provided on at least one of the image forming unit and the pedestal unit restricts the relative movement between the image forming unit and the pedestal unit in a direction intersecting the direction in which the delimiting mechanism restricts the relative movement. In this case, the positioning projection can be fitted in the positioning recess thus to achieve the positioning between the image forming unit and the pedestal unit, by relatively moving the image forming unit with respect to the pedestal unit in the direction intersecting the first direction with the relative movement in the first direction being restricted by the delimiting portion. As a result, the positioning projection can be more easily fitted in the positioning recess.

In the foregoing image forming apparatus, it is preferable that the delimiting portion includes a recess to be engaged with the projecting portion when the positioning projection is fitted in the positioning recess.

In this case, despite the positional relationship between the positioning projection and the positioning recess being invisible because of the delimiting portion, the positioning projection to be fitted in the positioning recess by engaging the projecting portion in the recess formed on the delimiting portion. Such a configuration allows the operator to perform the positioning between the image forming unit and the pedestal unit, even when the positional relationship between the positioning projection and the positioning recess cannot be visibly confirmed.

In the foregoing image forming apparatus, it is preferable that the stopper is provided on the delimiting portion.

Such a configuration allows, even when the projecting portion is relatively shifted from the recess and hence the projecting portion relatively moves (slips) along the delimiting portion, the projecting portion to abut the stopper formed on the delimiting portion, thus restricting the movement (slipping) of the projecting portion.

In the foregoing image forming apparatus, it is preferable that the projecting portion includes a positioning mark provided on an outer surface thereof.

In this case, the positioning projection can be easily fitted in the positioning recess by engaging the projecting portion with the recess, utilizing the positioning mark provided on the outer surface of the projecting portion as a guide.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, an embodiment of the present invention will be described referring to FIGS. 1 through 8B.

Figure 1:
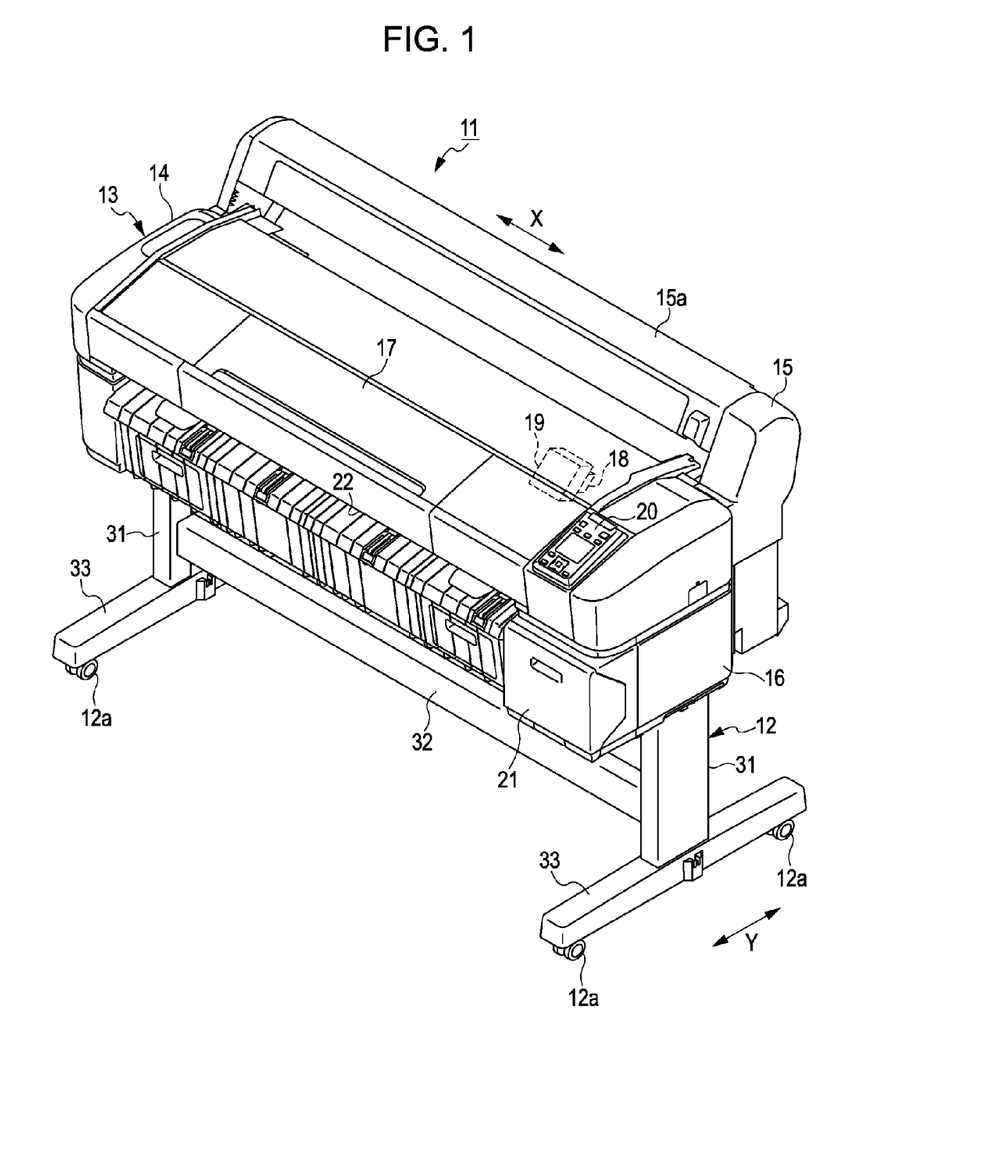
FIG. 1 is a perspective view showing an image forming apparatus.

An image forming apparatus 11 shown in FIG. 1 is an ink jet printer capable of printing images on large-format sheets (for example, AO or BO according to JIS).

The image forming apparatus 11 includes a leg unit 12 with casters 12a attached at the lowermost end for rolling on a floor, and an image forming unit 13 mounted on top of the leg unit 12 and assembled thereto. In this embodiment, the leg unit 12 exemplifies the pedestal unit.

The image forming unit 13 includes an image forming unit main body 14 of a generally rectangular block shape, and a paper feed unit 15 obliquely projecting up and backward from the rear portion of the image forming unit main body 14 and serving to support a paper roll holder 15a.

The paper roll holder 15a includes a spindle located inside a flip-up cover, and a roll of a sheet such as a paper sheet wound around a paper tube (neither shown) is retained so as to rotate about the spindle, inside the paper roll holder 15a. When the spindle is driven to rotate by a feed motor (not shown) so as to unwind the sheet from the roll, the sheet can be fed to the image forming unit main body 14. In addition, a paper feed slot (not shown) is provided on an upper portion of the rear portion of the image forming unit main body 14, for supplying cut-form sheets.

The image forming unit main body 14 includes a generally box-shaped outer housing 16 having an open top, and a cover 17 openably covering the open top. The image forming unit main body 14 accommodates therein a printing mechanism (not shown) that prints images on the sheet supplied. In a region of the image forming unit main body 14 under the cover 17, for example, a carriage 19 with a recording head 18 is mounted so as to reciprocate in a main scanning direction X. The image forming unit main body 14 also includes a plurality of transport roller pairs driven by a feed motor (not shown) so as to transport the sheet fed from the paper feed unit 15. The image forming apparatus 11 prints an image based on print data on the sheet, by generally alternately repeating a recording action of one scanning motion in which ink droplets are ejected from the recording head 18 while the carriage 19 moves in the main scanning direction X, and a transporting action to transport the sheet to the next recording position.

As shown in FIG. 1, an operation panel 20 through which a user inputs various settings and instructions to the image forming unit 13 is provided, for example, on an upper face of a right-hand end portion of the image forming unit main body 14. In addition, a cartridge chamber 21 in which a plurality of ink cartridges (not shown) of different colors are accommodated is provided, for example, at the right-hand end portion of the front face of the image forming unit main body 14. Color printing on the sheet is performed when the recording head 18 ejects the ink of different colors from the plurality of ink cartridges in the cartridge chamber 21.

A sheet outlet 22 through which the printed sheet is discharged is provided on a lower face of the image forming unit 13. The leg unit 12 is used with a collection unit (not shown) attached thereto, which may be exemplified by a take-up unit or a paper basket capable of collecting the printed sheet discharged through the sheet outlet 22, so that the printed sheet that has been discharged is collected into the collection unit. In the description given hereunder, the longitudinal direction of the image forming unit 13, i.e., the main scanning direction X may be referred to as first direction X, and the direction orthogonal to the longitudinal direction in a horizontal plane may be referred to as second direction Y. When the terms "first direction X" and "second direction Y" are used in the description of the leg unit 12, those directions are to be construed as indicating the directions based on the state where the leg unit 12 is assembled to constitute the image forming apparatus 11. Further, the first direction X may be referred to as left-right direction, and the second direction Y may be referred to as front-back direction.

As shown in FIG. 1, the leg unit 12 includes a left and right pair of leg portions 31 and a beam portion 32 horizontally extending so as to connect the pair of leg portions 31. The leg portions 31 each include a wheel portion 33 extending in the front-back direction and having casters 12a attached to the respective end portions of the wheel portion 33 in the front-back direction, and a support column 34 having a rectangular cross section and erected from a generally central portion of the wheel portion 33 in the longitudinal direction thereof. To be more detailed, the beam portion 32 has the respective end portions connected to the lower portion of the left and right support columns 34.

Figure 2:
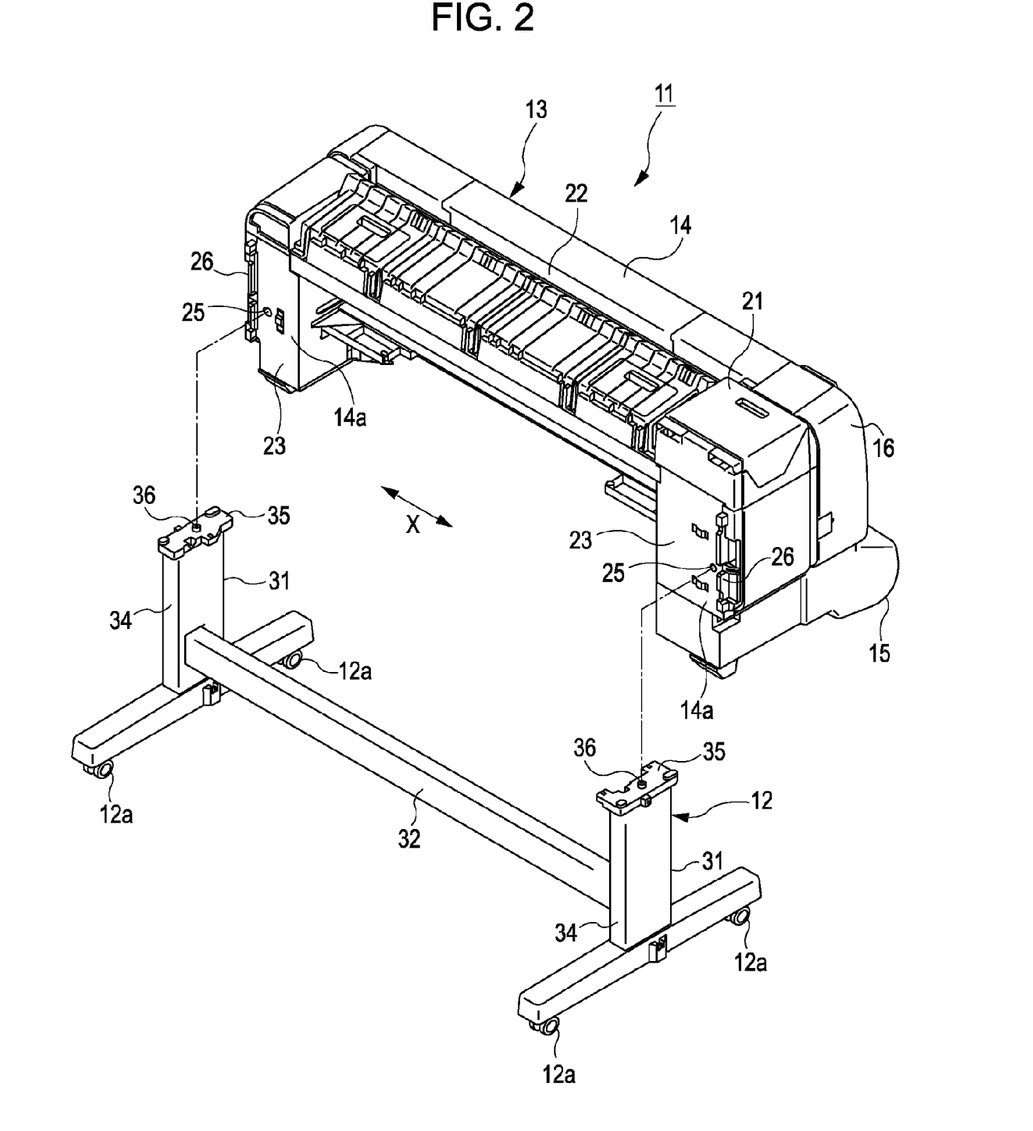
FIG. 2 is an exploded perspective view of the image forming apparatus.

Referring to FIG. 2, a seat plate 35 of a generally rectangular plate shape is fixed to the top portion of each of the pair of leg portions 31 of the leg unit 12. The image forming unit 13 is mounted on the upper surface of the pair of seat plates 35, at a predetermined position. A positioning pin 36 projecting upward, exemplifying the positioning projection, is provided at a generally central position of each of the seat plates 35. The seat plates 35 are formed of a molded resin, and fixed with a plurality of screws (not shown) to the top portion of the leg portion 31, made of a metal for example.

In addition, as shown in FIG. 2, the image forming unit main body 14 includes a left and right pair of mounting surfaces 23 respectively formed on the end portions of the bottom face of the image forming unit main body 14 in the first direction X. The mounting surfaces 23 are, for example, a part of the outer surface of a frame portion 14a formed of a metal plate constituting the bottom face of the image forming unit main body 14. The pair of mounting surfaces 23 each include a positioning hole 25, exemplifying the positioning recess, formed at the position opposing the corresponding positioning pin 36 on the seat plate 35. The positioning hole 25 has a shape and size that allow the positioning pin 36 to be loosely fitted in the positioning hole 25. In this embodiment, the positioning hole 25 is a through hole formed in the frame portion 14a (metal plate). In this embodiment, further, the left and right positioning pins 36 are of a generally circular column shape, and one of the positioning holes 25 (on the right in FIG. 2) is circular and the other (on the left in FIG. 2) is elliptical having the major axis aligned with the first direction X of the image forming unit 13.

As shown in FIG. 2, further, the image forming unit main body 14 includes a left and right pair of delimiting portions 26, respectively formed at the outer edge of the mounting surfaces 23 in the first direction X so as to project generally upright therefrom. The pair of delimiting portions 26 are each located at a position corresponding to an outer position of the outer edge of the opposing seat plate 35, and serve to restrict the relative movement of the image forming unit 13 with respect to the leg unit 12 in the first direction X.

Figure 3:
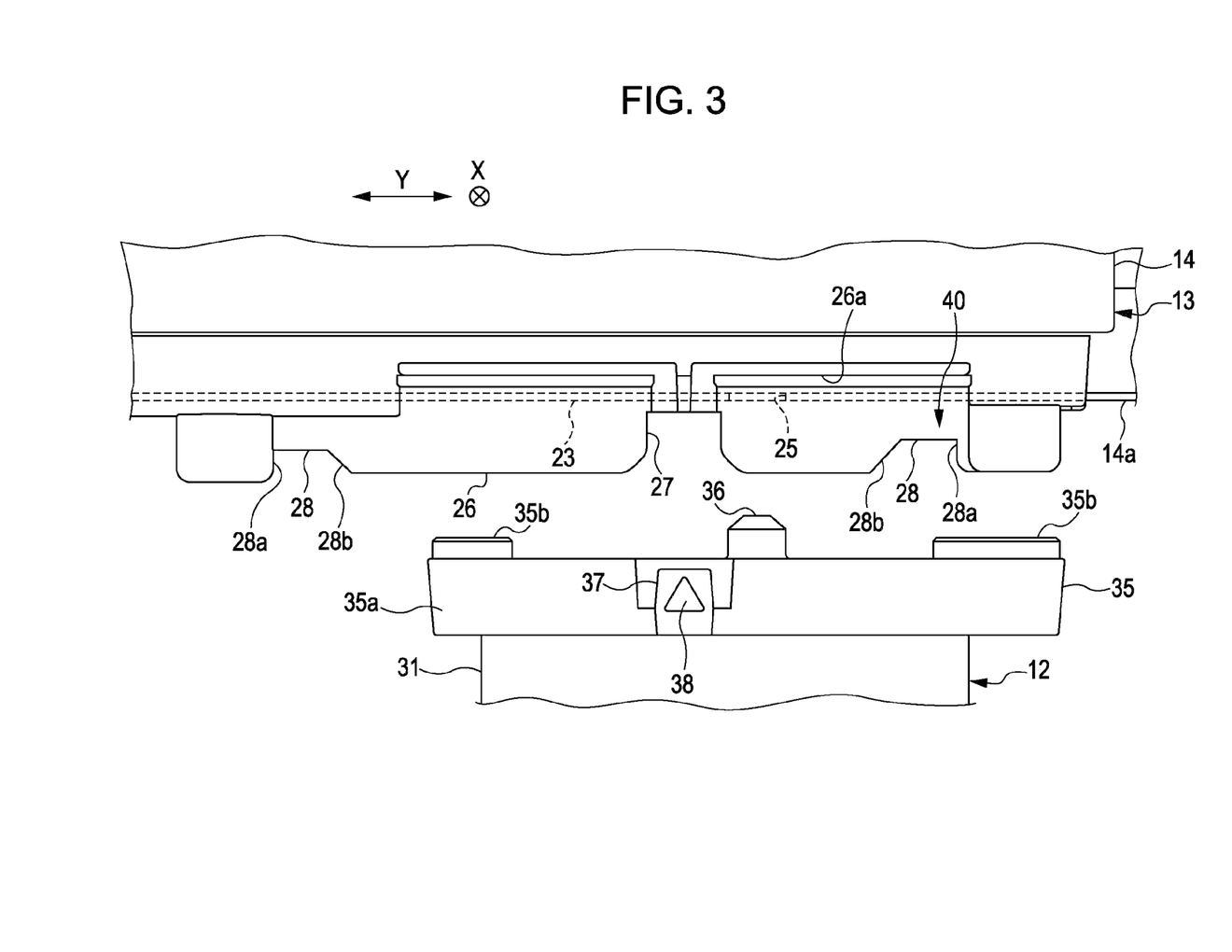
FIG. 3 is a fragmentary side view showing a positioning structure between a leg unit and an image forming unit.
Figure 4:
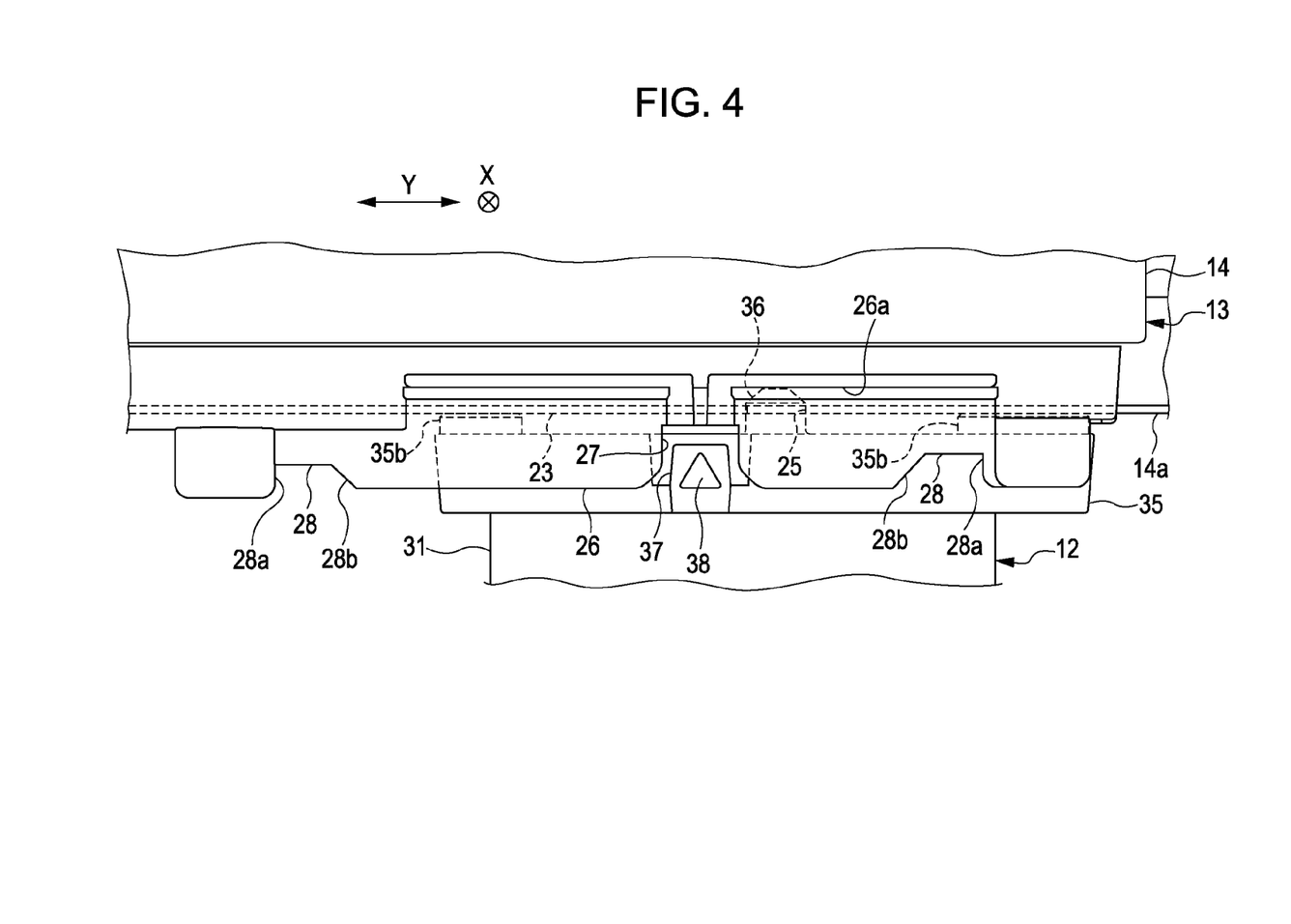
FIG. 4 is a fragmentary side view showing the image forming unit positioned with respect to the leg unit.
Figure 5:
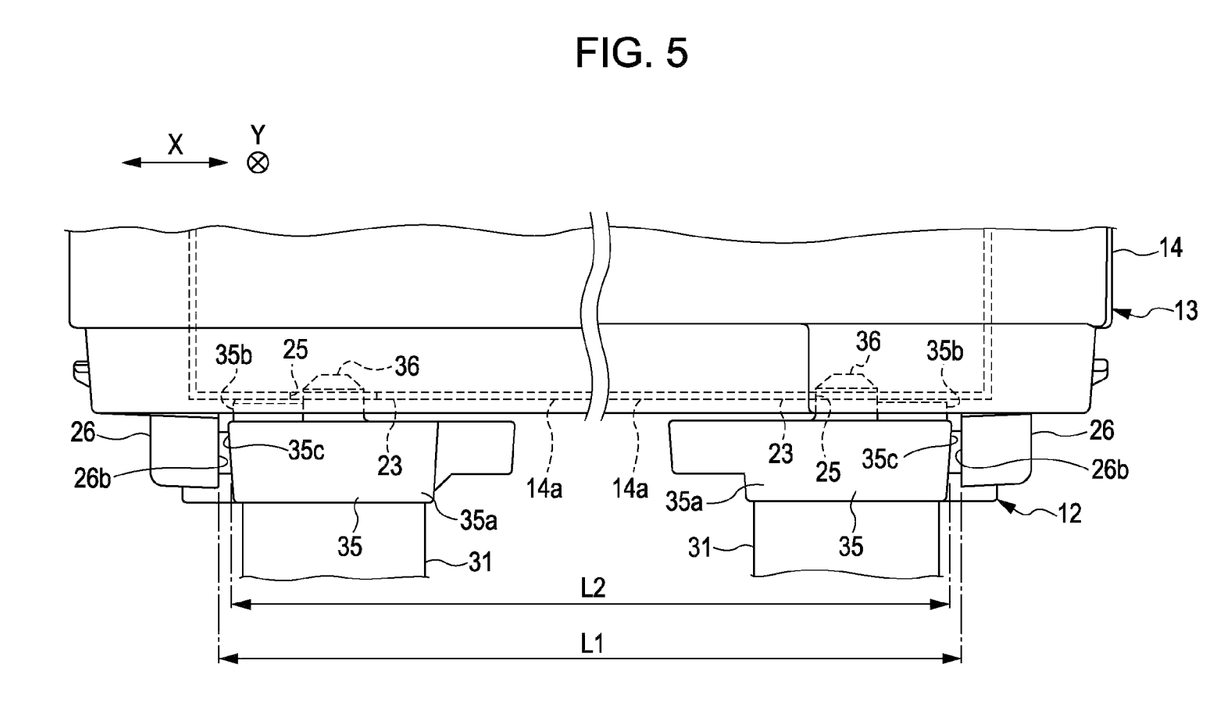
FIG. 5 is a fragmentary front view showing the image forming unit positioned with respect to the leg unit.

Referring now to FIGS. 3 to 5, the configuration of the seat plate 35 and the delimiting portion 26 will be described in further details. Since the seat plates 35 and the delimiting portions 26 on the left and right sides have substantially the same configuration, the following description only refers to the seat plate 35 and the delimiting portion 26 on the right side.

As shown in FIG. 3, the seat plate 35 attached to the top end of the leg portion 31 includes a generally rectangular base portion 35a having a predetermined thickness, a positioning pin 36 formed on the upper surface of the base portion 35a so as to project vertically upward from the position corresponding to the positioning hole 25, and an elevated portion 35b of a relatively flat column shape having a lower vertical height than the positioning pin 36. The seat plate 35 also includes a projecting portion 37 of a rectangular column shape formed on an outer lateral face of the base portion 35a so as to outwardly project in the first direction X. The seat plates 35 each include one projecting portion 37, and hence the leg unit 12 according to this embodiment includes two projecting portions 37.

A positioning mark 38 that serves as an index for positioning when the positioning pin 36 is to be fitted in the positioning hole 25 is provided on the outer end face of the projecting portion 37. The positioning mark 38 is formed in a three-dimensional shape on the seat plate 35, in the resin molding process. Alternatively, the positioning mark 38 may be realized by painting or adhering a sticker. In the case of resin molding, the protrusion or the recess representing the mark may be painted in a color different from that of the resin. Although a triangle is adopted as the positioning mark 38 in this embodiment, the positioning mark 38 may be formed in a desired shape such as an arrow, a circle, or a square.

As shown in FIG. 3, the delimiting portion 26 is formed by resin molding in a slender plate shape extending in the second direction Y of the image forming unit main body 14, and fixed to the lower end of the lateral face of the image forming unit main body 14, with a plurality of screws (not shown). The delimiting portion 26 has a length approximately half the length of the image forming unit main body 14 in the second direction Y, and projecting downward with respect to the mounting surface 23 by a predetermined length, for example in a range of 10 to 50 mm.

The delimiting portion 26 includes a recess 27 formed at the position to oppose the projecting portion 37 in the vertical direction when the positioning hole 25 is aligned with the positioning pin 36 in the vertical direction. The recess 27 has a shape and size that allow the projecting portion 37 to be fitted therein. Accordingly, upon inserting the projecting portion 37 in the recess 27, the positioning pin 36 is fitted in the positioning hole 25. The lower end portion of the recess 27 expands toward the lowermost edge, so as to allow the projecting portion 37 to be inserted in the recess 27 even though the relative position between the projecting portion 37 and the recess 27 in the second direction Y (left-right direction in FIG. 3) is slightly shifted. From the viewpoint of the operator about to mount the image forming unit 13 on the leg unit 12, the positioning hole 25 is hidden behind the delimiting portion 26 as shown in FIG. 3, and the positioning pin 36 is hidden behind the delimiting portion 26 when the image forming unit 13 is to be positioned as shown in FIG. 4 from the state shown in FIG. 3. In this embodiment, therefore, the positioning hole 25 and the positioning pin 36 can be properly positioned with each other by inserting the projecting portion 37 in the recess 27.

Further, as shown in FIG. 3, the delimiting portion 26 includes stoppers 28 formed on the lower end thereof, at positions distant from the recess 27 to the rear side (to the right in FIG. 3) and the forward side, by a predetermined distance in the second direction Y. The stoppers 28 are recessed upward in dimensions that allow the projecting portion 37 to be accommodated therein. Between the pair of stoppers 28, the one on the rear side (on the right in FIG. 3) is located relatively close to the recess 27, and the other on the front side (on the left in FIG. 3) located relatively farther from the recess 27. Such locations correspond to the position of the projecting portion 37 on the seat plate 35 in the second direction Y. To be more detailed, the stopper 28 that restricts the relative movement of the image forming unit 13 in the second direction Y toward the front end portion of the seat plate 35 (to the left in FIG. 3) is located relatively closer to the recess 27, because the distance between the projecting portion 37 and the front end portion of the seat plate 35 is relatively shorter. Likewise, the stopper 28 that restricts the relative movement of the image forming unit 13 in the second direction Y toward the rear end portion of the seat plate 35 (to the right in FIG. 3) is located relatively farther from the recess 27, because the distance between the projecting portion 37 and the rear end portion of the seat plate 35 is relatively longer. In this embodiment, the projecting portion 37 and the stoppers 28 constitute the delimiting mechanism 40.

As shown in FIG. 3, the inner walls of the stoppers 28 of the recessed shape, on the respective sides more distant from the recess 27 in the second direction Y, serve as delimiting surfaces 28a generally orthogonal to the second direction Y. In addition, the inner walls of the stoppers 28 on the respective sides closer to the recess 27 in the second direction Y, i.e., the inner walls opposing the respective delimiting surfaces 28a in the second direction Y, serve as inclined surfaces 28b, exemplifying the sloped surface. The inclined surfaces 28b are each inclined such that the recess becomes gradually shallower toward the recess 27 from the side of the delimiting surface 28a. The width of the bottom portion of the stopper 28 in the second direction Y is generally the same as or slightly wider than width of the projecting portion 37 in the second direction Y. Accordingly, the projecting portion 37 sliding along the lower face of the delimiting portion 26 is guided into the stopper 28 along the inclined surface 28b. The projecting portion 37 engaged with the stopper 28 makes contact with the delimiting surface 28a, thereby being restricted from moving further in the sliding direction.

Further, the delimiting portion 26 includes a holding hole 26a formed in a slender elliptical shape extending in the second direction Y and located above the recess 27. The holding hole 26a has a size that allows the operator to insert the fingers, and is utilized when the operator holds the image forming unit 13 at the respective sides in the longitudinal direction thereof.

Referring to FIG. 4, upon inserting the projecting portion 37 in the recess 27 utilizing the positioning mark 38 as index, the positioning pin 36 on the seat plate 35 is inserted in the positioning hole 25 of the mounting surface 23, so that the mounting surface 23 is properly positioned with respect to the seat plate 35. Since the elevated portion 35b contacts the mounting surface 23 in this state, a small gap is secured between the bottom portion of the recess 27 and the projecting portion 37. Thus, making the elevated portion 35b abut the mounting surface 23 exempts the projecting portion 37 and the positioning pin 36 from being subjected to the weight of the image forming unit 13.

FIG. 5 is a front view of the image forming unit 13 mounted on the seat plate 35. As shown in FIG. 5, a distance (clearance) L1 between the left and right pair of delimiting portions 26 in the first direction X is slightly longer than a distance L2 between the respective outer lateral faces of the left and right pair of seat plates 35 (except for the projecting portion 37).

When the image forming unit 13 is to be mounted on the leg unit 12, the left and right pair of delimiting portions 26 are brought so as to hold therebetween the left and right pair of seat plates 35, and the inner walls of the pair of delimiting portions 26 and the outer lateral faces of the pair of seat plates 35 are respectively made to oppose each other with a slight gap (for example in a range of 1 to 10 mm) therebetween. The extending length of the delimiting portion 26 from the mounting surface 23 is set so as to allow the delimiting portion 26 to oppose the outer lateral face of the seat plate 35 when the positioning pin 36 and the positioning hole 25 are brought close to each other by a predetermined distance in the fitting direction (vertical direction), i.e., slightly before the engagement. In other words, when the mounting surface 23 of the image forming unit 13 is brought to the state immediately before the engagement with the seat plate 35, i.e., when the positioning pin 36 is brought to a position distant from the positioning hole 25 by a predetermined distance in the vertical direction, at least a part of the left and right pair of delimiting portions 26 opposes the outer lateral faces of the left and right pair of seat plates 35. At this point, the relative movement of the image forming unit 13 with respect to the seat plate 35 of the leg unit 12 in the longitudinal direction (first direction) is restricted with just a slight room for movement.

An assembly process of the image forming apparatus 11 configured as above will now be described hereunder.

The image forming unit 13 is lifted and brought above the leg unit 12, and then mounted thereon by inserting the positioning pin 36 in the positioning hole 25. The details of such an operation will be described hereunder.

Figure 6:
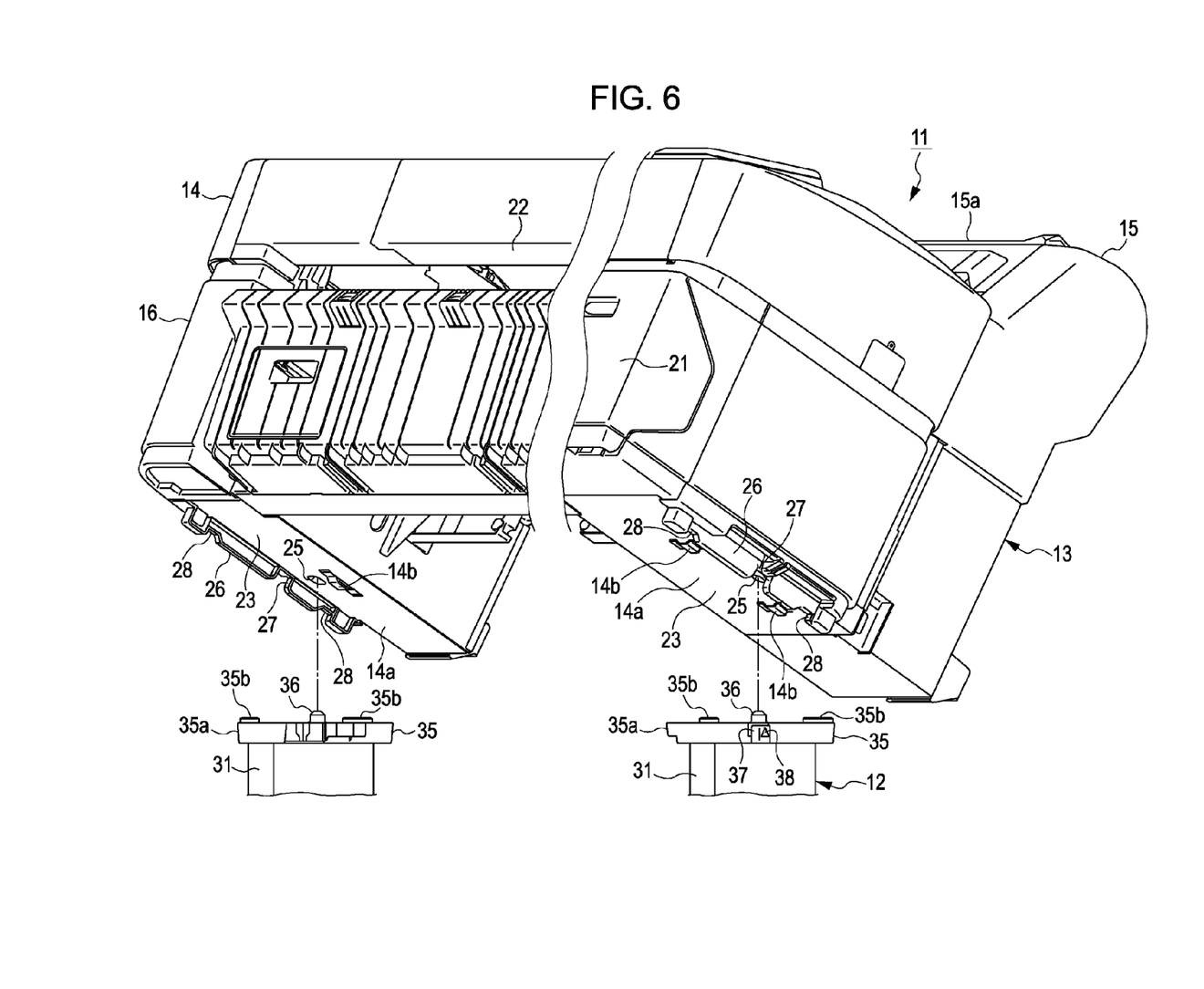
FIG. 6 is a fragmentary perspective view showing the image forming unit about to be positioned with respect to the leg unit.

Referring to FIG. 6, the operator inserts the fingers in the holding holes 26a of the respective delimiting portions 26 of the image forming unit 13, to thereby lift the image forming unit 13 and bring it above the leg unit 12. Then the image forming unit 13 is mounted on the seat plates 35 of the leg unit 12 upon disposing the image forming unit 13 such that the positioning pins 36 of the seal plates 35 of the leg unit 12 are respectively inserted in the pair of positioning holes 25 formed in the mounting surface 23. To do so, first the image forming unit 13 is generally positioned with respect to the leg unit 12 in the first direction X, and the image forming unit 13 is brought closer to the seat plate 35 so as to insert the projecting portion 37 in the recess 27 utilizing as index the positioning mark 38 on the lateral end face of the projecting portion 37. Then the left and right pair of delimiting portions 26 are respectively made to oppose the outer lateral faces of the left and right pair of seat plates 35, with a small gap therebetween. At this point, the relative movement of the image forming unit 13 with respect to the leg unit 12 in the first direction X is restricted with just a slight room for movement.

Thereafter, the position of the image forming unit 13 is adjusted in the second direction Y utilizing the positioning mark 38 as index, so as to insert the projecting portion 37 in the recess 27. When the projecting portion 37 is inserted in the recess 27 to a certain depth (for example, approximately one third), the positioning pin 36 starts to be inserted in the positioning hole 25, and when the positioning pin 36 is inserted in the positioning hole 25 to a predetermined sufficient depth, the elevated portion 35b contacts the mounting surface 23. At this point, the image forming unit 13 is mounted on the seat plates 35, properly positioned thereon by the engagement between the positioning pin 36 and the positioning hole 25. Thus, even though the positioning pin 36 is hidden behind the delimiting portion 26 and hence unseen from outside, the positioning pin 36 can be fitted in the positioning hole 25 by inserting the projecting portion 37 in the recess 27. Then a screw (not shown) is inserted in a through hole (not shown) of the seat plate 35 from below and engaged with a threaded hole (not shown) of each of a plurality of mounting plates 14b (see FIG. 6) attached to the mounting surface 23 of the image forming unit 13, so as to fix the image forming unit 13 to the leg unit 12 by fastening the screw at a plurality of positions.

Figure 7A:
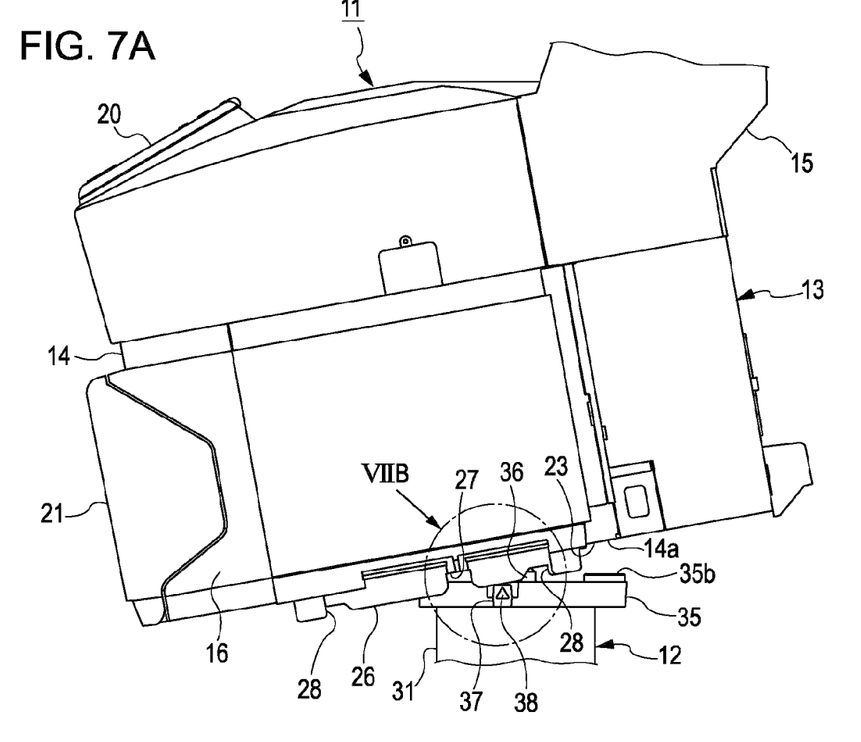
FIG. 7A is a fragmentary side view showing the image forming unit slipping on the leg unit.
Figure 7B:
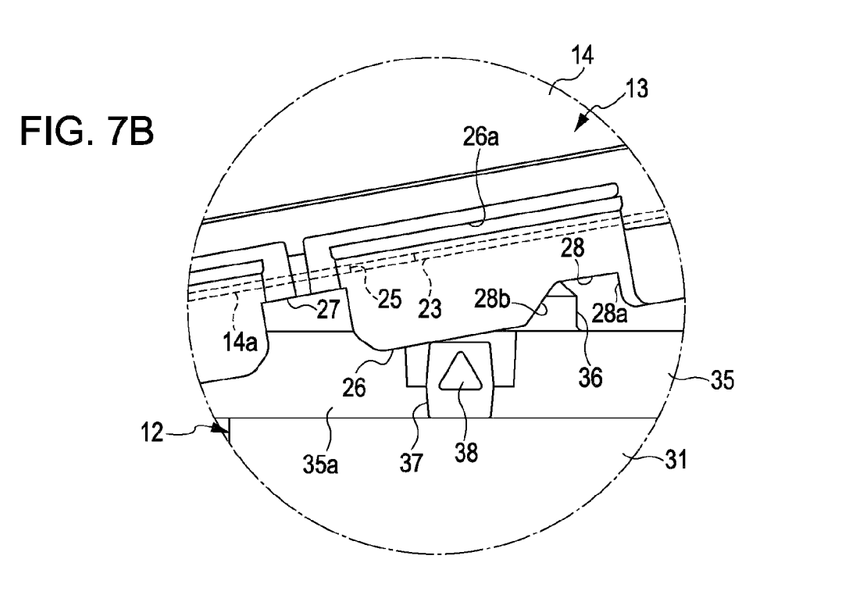
FIG. 7B is an enlarged view of a portion indicated by VIIB in FIG. 7A.

Now, in case that, in the attempt to insert the projecting portion 37 in the recess 27 from the state shown in FIG. 6 utilizing the positioning mark 38 as index, the projecting portion 37 fails to be properly inserted in the recess 27 and thus shifted from the recess 27 as shown in FIGS. 7A and 7B, the projecting portion 37 makes contact with the lower end face of the delimiting portion 26. When the image forming unit 13 is tilted, for example to the front side as shown in FIG. 7A, the center of gravity of the image forming unit 13 is shifted in the tilting direction thereby causing the tilted image forming unit 13 to relatively move forward with respect to the seat plate 35. In this process, the lower end face of the portion of the delimiting portion 26 on the rear side of the recess 27 slides on the projecting portion 37 as shown in FIG. 7B.

Figure 8A:
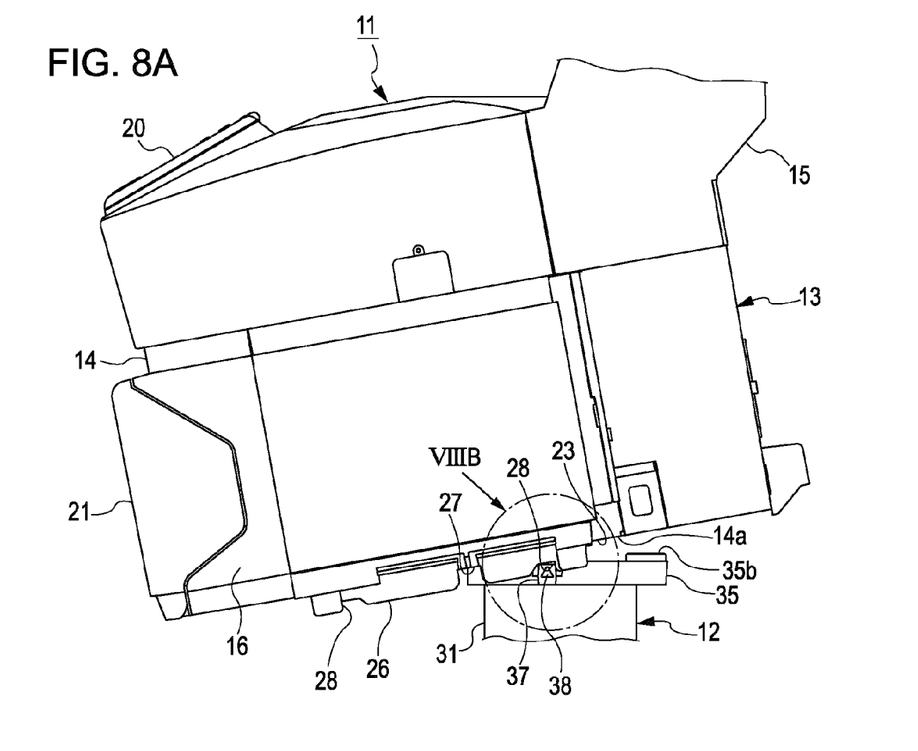
FIG. 8A is a fragmentary side view showing the image forming unit restricted from slipping on the leg unit.
Figure 8B:
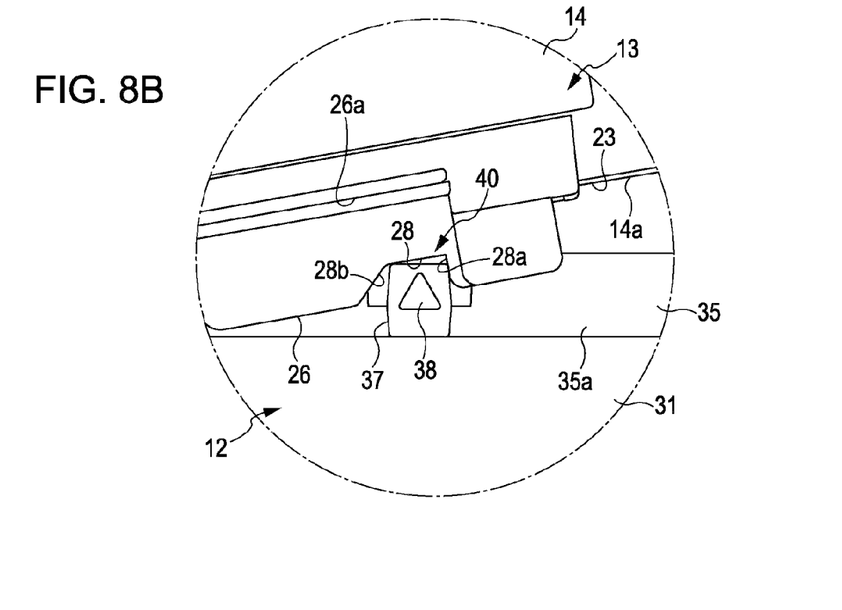
FIG. 8B is an enlarged view of a portion indicated by VIIIB in FIG. 8A.

When the lower end face of the delimiting portion 26 slides on the projecting portion 37 by a predetermined distance, the projecting portion 37 enters the recessed stopper 28 of the delimiting portion 26 as shown in FIGS. 8A and 8B, and is made to abut the delimiting surface 28a so that the image forming unit 13 is restricted from moving further forward. Therefore, even though the tilted image forming unit 13 starts to slide forward with respect to the seat plate 35, the sliding motion is immediately restricted so as to minimize the displacement. In addition, since the projecting portion 37 is guided into the recessed stopper 28 along the inclined surface 28b, the projecting portion 37 can be smoothly introduced in the stopper 28 thus to be securely restricted from moving further, and is subjected to a smaller impact when being introduced into the stopper 28.

Likewise, in case that the projecting portion 37 is relatively shifted forward with respect to the recess 27 in the positioning process and the image forming unit 13 is tilted backward, the image forming unit 13 relatively moves backward with respect to the seat plate 35, with the sliding motion of the lower end face of the delimiting portion 26 on the projecting portion 37. When the lower end face of the delimiting portion 26 slides on the projecting portion 37 by a predetermined distance, the projecting portion 37 enters the stopper 28 on the front side and is made to abut the delimiting surface 28a, so that the image forming unit 13 that has started to slide backward with respect to the seat plate 35 is restricted from moving further. Therefore, even though the image forming unit 13 tilted backward starts to slide backward with respect to the seat plate 35, the sliding motion is immediately restricted so as to minimize the displacement. In addition, since the projecting portion 37 is guided along the inclined surface 28b, the projecting portion 37 can be securely restricted from moving further, and is subjected to a smaller impact when being introduced into the stopper 28.

After the relative movement of the image forming unit 13 is thus restricted, the image forming unit 13 is brought back to the positioning location, to resume the positioning. To move the image forming unit 13 backward from the state shown in FIG. 8B, since the projecting portion 37 is guided along the inclined surface 28b, the projecting portion 37 can escape from the stopper 28 with a relatively small force. Therefore, the load for bringing the image forming unit 13 back to the positioning location with respect to the seat plate 35 can be considerably reduced.

As described above in details, this embodiment provides the following advantageous effects.

Since the stoppers 28 are provided on the respective sides of the recess 27 in the longitudinal direction of the delimiting portion 26 (first direction X), the projecting portion 37, on which the lower end face of the delimiting portion 26 is sliding, is made to abut the stopper 28 thus to be restricted from moving further, even when the projecting portion 37 fails to be properly inserted in the recess 27 and the image forming unit 13 is tilted and relatively displaced with respect to the seat plate 35. Accordingly, the image forming unit 13 is restricted from moving further with respect to the seat plate 35, and thus the displacement of the image forming unit 13 with respect to the seat plate 35 can be minimized. Consequently, the image forming unit 13 can be thereafter brought back to the positioning location with a small movement, and the load for this operation is alleviated.

The delimiting mechanism 40 is composed of the plurality of projecting portions 37 provided on the seat plates 35, and the stoppers 28 located at the position that allows the projecting portion 37 to be introduced therein when the image forming unit 13 and the leg unit 12 are relatively shifted in the second direction Y. Thus, the delimiting mechanism 40 can be realized by a relatively simple structure.

Since the pair of delimiting portions 26 are provided on the lower end of the respective lateral faces of the image forming unit 13, the relative movement of the image forming unit 13 with respect to the seat plate 35 in the first direction X can be substantially restricted. In particular, the projecting length of the delimiting portion 26 from the mounting surface 23 is set so as to oppose the outer lateral face of the seat plate 35 before the positioning pin 36 and the positioning hole 25 come close to each other in the vertical direction so as to start to be engaged. Therefore, the positioning pin 36 can be inserted in the positioning hole 25 to achieve the positioning, by moving the image forming unit 13 in the second direction Y while the relative movement between the image forming unit 13 and the leg unit 12 in the first direction X is substantially restricted.

The delimiting portion 26 includes the recess 27 formed so as to be engaged with the projecting portion 37 when the positioning pin 36 is set to oppose the positioning hole 25. Therefore, the positioning pin 36 can be fitted in the positioning hole 25 by engaging the projecting portion 37 with the recess 27, despite the positional relationship between the positioning pin 36 and the positioning hole 25 being hidden behind the delimiting portion 26 and hence invisible.

The delimiting portion 26 includes the stoppers 28. Therefore, even though the lower end face of the delimiting portion 26 slides on the projecting portion 37 when the projecting portion 37 is deviated from the recess 27 and the tilted image forming unit 13 is relatively displaced with respect to the seat plate 35, the projecting portion 37 is made to abut the delimiting surface 28a of the stopper 28, so as to restrict the image forming unit 13 from sliding (relatively moving) further with respect to the leg unit 12. Consequently, the displacement of the image forming unit 13 can be minimized.

The stoppers 28 each include the inclined surface 28b formed on the side of the recess 27, and therefore the projecting portion 37 is guided along the inclined surface 28b thus to be smoothly introduced into the stopper 28. Consequently, the relative movement (sliding motion) of the image forming unit 13 with respect to the seat plate 35 can be securely restricted, and the impact of the restriction can be mitigated.

When the image forming unit 13 restricted by the stopper 28 is brought back to the positioning location, the projecting portion 37 escapes from the stopper 28 guided along the inclined surface 28b. Therefore, the load for bringing the image forming unit 13 back to the positioning location can be considerably reduced.

The foregoing embodiment may be modified as follows.

Figure 9:
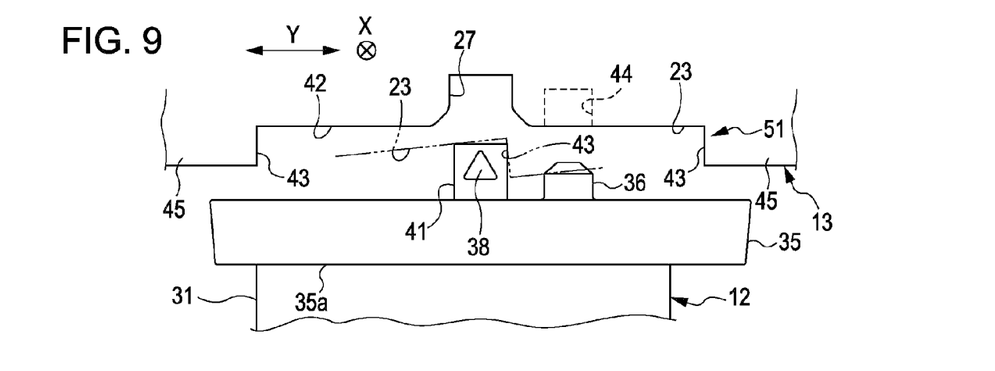
FIG. 9 is a schematic side view showing a positioning structure according to a variation.

As shown in FIG. 9, a projecting portion 41 may be formed so as to upwardly project from the upper surface of the seat plate 35. In this case, the recess 27 to be engaged with the projecting portion 41 and a delimiting recess 42 are provided on the lower end portion of the left and right lateral faces of the image forming unit 13. The recess 42 continuously extends from the recess 27 to the respective sides thereof in the second direction Y, over a long distance including the region under the portion on the respective sides of the recess 27. The respective inner end faces (inner walls) of the delimiting recess 42 in the second direction Y serve as stoppers 43 (delimiting surfaces). In this example, the projecting portion 41 and the stoppers 43 constitute a delimiting mechanism 51. For example, in case that the projecting portion 41 is deviated from the recess 27 in the positioning process to fit the positioning pin 36 in a positioning hole 44 of the mounting surface 23 and the projecting portion 41 slides along the mounting surface 23, the projecting portion 41 is made to abut the stopper 43 thus to be restricted from moving further. In the example shown in FIG. 9, delimiting portions 45 are formed so as to project downward from the respective sides of the delimiting recess 42 in the second direction Y, in a length that allows the delimiting portions 45 to oppose the respective outer lateral faces of the seat plate 35. The projecting length of the delimiting portion 45 from the mounting surface 23 is set so as to oppose the outer lateral face of the seat plate 35 before the positioning pin 36 and the positioning hole 44 come close to each other so as to start to be engaged. When the delimiting portion 26 is disposed to oppose the seat plate 35, the relative movement between the leg unit 12 and the image forming unit 13 in the first direction X is restricted. In FIG. 9, the elevated portion 35b (see FIG. 3) on the seat plate 35 is not illustrated.

Figure 10:
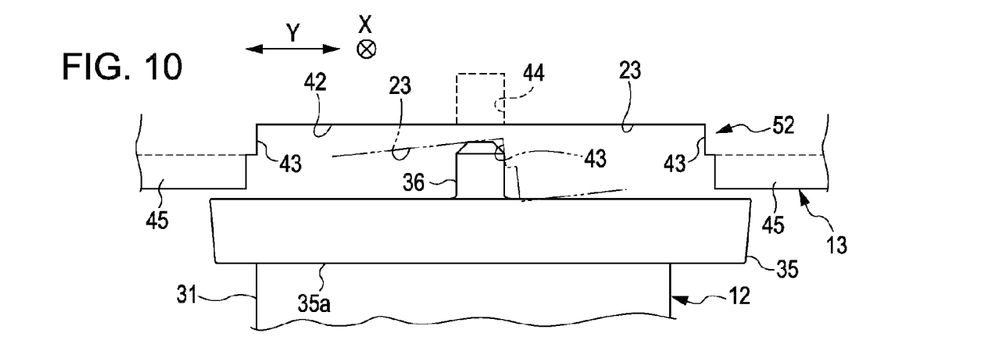
FIG. 10 is a schematic side view showing a positioning structure according to another variation.

The projecting portion may be excluded. As shown in FIG. 10, the image forming unit 13 includes the delimiting recess 42 formed on the lower end portion of the left and right lateral faces thereof. The delimiting recess 42 extends in the second direction Y over a long distance including the region under the portion on the respective sides of the positioning hole 44, and the end faces of the delimiting recess 42 in the second direction Y serve as the stoppers 43 (delimiting surfaces). In this example, the positioning pin 36 and the stoppers 43 constitute a delimiting mechanism 52. For example, in case that the positioning pin 36 is deviated from the positioning hole 44 in the positioning process to fit the positioning pin 36 in the positioning hole 44, and the mounting surface 23 slides on the positioning pin 36, the positioning pin 36 is made to abut the stopper 43 thus to be restricted from moving further. Thus, in the case where the delimiting portion which hides the positioning pin 36 when the positioning pin 36 is to be fitted in the positioning hole 44 is not provided, the projecting portion 41 and the recess 27 may be excluded. Further, in FIG. 10 the delimiting portions 45 for restricting the relative movement between the leg unit 12 and the image forming unit 13 in the first direction X are provided in a length that allows the delimiting portions 45 to oppose the respective outer lateral faces of the seat plate 35, as in the example shown in FIG. 9. Here, it is preferable to provide a positioning mark at the position corresponding to the positioning hole 44 on the lower end of the lateral face of the image forming unit 13, as index for fitting the positioning pin 36 in the positioning hole 44. In FIG. 10, the elevated portion 35b is not illustrated.

Figure 11:
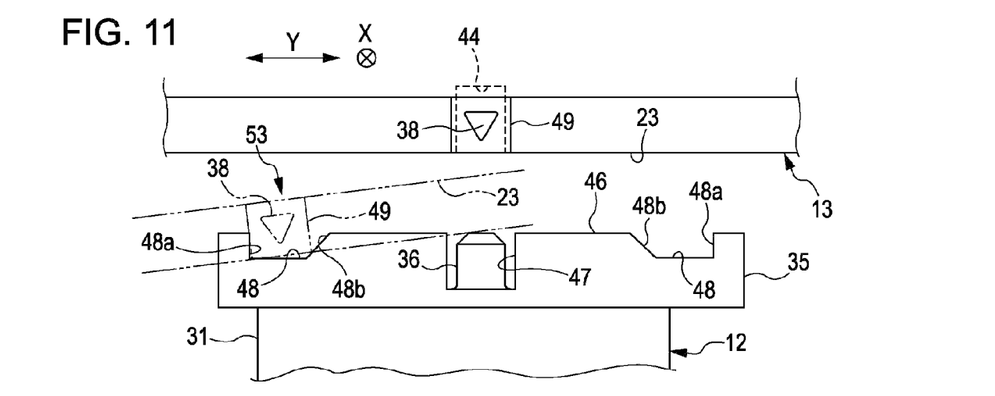
FIG. 11 is a schematic side view showing a positioning structure according to still another variation.

It suffices that the delimiting portion is provided on at least one of the image forming unit and the pedestal unit. For example, as shown in FIG. 11, a delimiting portion 46 may be provided on the seat plate 35 of the leg unit 12. The delimiting portion 46 has generally the same structure as that of the delimiting portion 26 of the image forming unit 13 according to the foregoing embodiment, and includes a recess 47 and stoppers 48 having the same configuration and function as those of the recess 27 and the stoppers 28 according to the embodiment. Thus, projecting portions 49 and the stoppers 48 constitute a delimiting mechanism 53. In the example shown in FIG. 11, the projecting portions 49 are formed on the lower end of the respective lateral faces of the image forming unit 13, and the positioning pin 36 can be fitted in the positioning hole 44 by engaging the projecting portion 49 with the recess 47 utilizing the positioning mark 38 as index. For example, in case that the projecting portion 49 is deviated from the recess 47 in the positioning process and the tilted image forming unit 13 relatively moves with respect to the seat plate 35 making the projecting portion 49 to slide on the upper end face of the delimiting portion 46, the projecting portion 49 is made to abut the delimiting surface 48a of the stopper 48 thus to be restricted from moving further. In addition, the inclined surface 48b formed in the stopper 48 on the side of the recess 47 assures that the projecting portion 49 falls into the stopper 48 thus to be securely restricted from moving further. Further, the projecting portion 49 is subjected to a smaller impact when being introduced into the stopper 48 and the load for bringing the image forming unit 13 back to the positioning location can be considerably reduced. As shown in FIG. 11, further, the positions of the positioning pin 36 and the positioning hole 44, and the positions of the projecting portion 49 and the recess 47 may be generally the same in the second direction Y.

In the embodiment and the variations shown in FIGS. 9 to 11, a positioning pin (positioning projection) may be provided on the mounting surface 23 of the image forming unit 13, and a positioning hole (positioning recess) may be provided in the seat plate 35 of the leg unit 12.

A delimiting mechanism (for example, a projecting portion and a stopper) may be provided for restricting the relative movement between the image forming unit 13 and the leg unit 12 in the first direction X. In this case, a second delimiting mechanism for restricting the relative movement in the first direction X may be provided in addition to the first delimiting mechanism that restricts the relative movement in the second direction Y, or the second delimiting mechanism may be provided in place of the first delimiting mechanism. In the former case in particular, totally four delimiting portions may be provided on the left and right sides and front and rear sides of the image forming unit, and in the latter case a pair of delimiting portions may be provided on the front and rear sides of the lower end portion of the image forming unit. In the case where the second delimiting mechanism includes a projecting portion, the direction in which the projecting portion is to outwardly project corresponds to the second direction Y. In the aforementioned cases, whichever of the leg unit 12 and the image forming unit 13 may include the projecting portion or the stopper (delimiting recess or delimiting surface), in the second delimiting mechanism.

The stopper may be formed in a protruding shape that can be engaged with a recess. For example, in the embodiment and the variation shown in FIG. 9, stoppers of a protruding shape may be provided, instead of the recessed stoppers 28, on the respective sides of the projecting portion 37 or the projecting portion 41 at positions distant therefrom by a predetermined distance in the second direction Y. Further, in the variation shown in FIG. 11, stoppers of a protruding shape that can be engaged with the recess 47 may be provided on the respective sides of the projecting portion 49 in the second direction Y, instead of the recessed stoppers 48.

It suffices that the sloped surface be formed such that the recess becomes gradually shallower toward the outer edge and, as long as the sloped surface is thus formed, the surface may be a convex or concave curved surface or a mixture thereof, without limitation to an inclined flat surface. Further, the inclination may vary at different positions.

The number of positioning mechanisms including the positioning projection and the positioning recess is not limited to two (a pair), but may be three, four, five or more, and the image forming unit and the pedestal unit may be positioned with each other at three or more positions.

It is not mandatory that the recess be provided in the delimiting portion. For example, the recess may be formed in a member not provided with the delimiting mechanism. Likewise, it is not mandatory that the recessed stopper be provided in the delimiting portion.

The configuration of the pedestal unit is not limited to the leg unit 12. The pedestal unit may be a paper feed unit carrying a single or a plurality of paper feed cassettes. In a multi-function printer, a printing unit may be provided as the pedestal unit and a scanner unit may be provided at the position of the image forming unit. Alternatively, a plurality of image forming units may be stacked on the pedestal unit and the image forming units may be positioned with each other with a positioning mechanism including a positioning projection and a positioning recess. In this case, a delimiting mechanism that restricts the movement of the image forming unit when the image forming unit relatively moves with respect to the seat plate in contact therewith. Thus, the pedestal unit may serve merely as a leg or base that supports the image forming unit, or as a unit (feeding unit or collection unit) that performs functions necessary for the image forming (transport of medium or collection thereof) in collaboration with the image forming unit, not only as a leg or base.

The image forming apparatus is not limited to a recording apparatus that forms images on a sheet by printing (recording). For example, the image forming apparatus may be an image reading apparatus, such as a scanner, that reads images on a source material placed on the document table to generate image data. Further, the image forming apparatus may be a multifunction apparatus having printing, scanning, and copying functions.

In the case where the image forming apparatus is a printer, the printer may be a dot impact printer or a laser printer, without limitation to an ink jet printer. Further, without limitation to a serial printer, the printer may be a line printer or a page printer.

The entire disclosure of Japanese Patent Application No. 2012-87638, filed Apr. 6, 2012 is expressly incorporated by reference herein.

What is claimed is:

1. An image forming apparatus comprising:
an image forming unit mounted via a mounting surface thereof on a seat plate of a pedestal unit, one of the seat plate and the mounting surface having a positioning recess to be fitted to a positioning projection provided on the other for positioning the image forming unit with respect to the pedestal unit; and
a delimiting mechanism that restricts a relative movement between the image forming unit and the seat plate disposed in contact with each other;
wherein the delimiting mechanism includes:
a plurality of projecting portions formed on the pedestal unit so as to outwardly project from the seat plate in a first direction;
a stopper having a recessed shape, defined by an upper surface, a first orthogonal delimiting surface and a second inclined delimiting surface, into which the projecting portions are guided, said stopper being formed at a position that allows the stopper to contact the projecting portions when the image forming unit and the pedestal unit relatively move in a direction intersecting the first direction; and the projecting portions are able to move along the second inclined delimiting surface when the image forming unit is in contact with the pedestal unit and moved with respect to the pedestal unit; and
a holding hole having a slender shape sized to allow an operator to insert a finger;
wherein the second inclined delimiting surface is located closer to a midpoint of the image forming unit than the first orthogonal delimiting surface and the second inclined delimiting surface is inclined such that the stopper becomes generally shallower towards the midpoint.

2. The image forming apparatus according to claim 1, wherein at least one of the image forming unit and the pedestal unit includes a delimiting portion that restricts the relative movement between the image forming unit and the pedestal unit in a direction intersecting the direction in which the delimiting mechanism restricts the relative movement.

3. The image forming apparatus according to claim 2, wherein the delimiting portion includes a recess to be engaged with a projecting portion when the positioning projection is fitted in the positioning recess.

4. The image forming apparatus according to claim 3, wherein the stopper is provided in the delimiting portion.

5. The image forming apparatus according to claim 3, wherein at least one of the plurality of projecting portions includes a positioning mark provided on an outer surface thereof.

6. An image forming apparatus comprising:
an image forming unit mounted via a mounting surface thereof on a seat plate of a pedestal unit, one of the seat plate and the mounting surface having a positioning recess to be fitted to a positioning projection provided on the other for positioning the image forming unit with respect to the pedestal unit; and
a delimiting mechanism that restricts a relative movement between the image forming unit and the seat plate disposed in contact with each other;
wherein the delimiting mechanism includes:
a plurality of projecting portions formed on the pedestal unit so as to upwardly project from the seat plate in a first direction;
a stopper having a recessed shape, defined by an upper surface, a first orthogonal delimiting surface and a second inclined delimiting surface, into which the projecting portions are guided, said stopper being is formed at a position that allows the stopper to contact the projecting portions when the image forming unit and the pedestal unit relatively move in a direction intersecting the first direction; and the projecting portions are able to move along the second inclined delimiting surface when the image forming unit is is in contact with the pedestal unit and moved with respect to the pedestal unit; and a holding hole having a slender shape sized to allow an operator to insert a finger;

wherein the second inclined delimiting surface is located closer to a midpoint of the image forming unit than the first orthogonal delimiting surface and the second inclined delimiting surface is inclined such that the stopper becomes generally shallower towards the midpoint.

* * * * *